Jan. 8, 1952  W. J. KIENE  2,582,042
VALVE
Filed July 31, 1946

INVENTOR.
WILLIAM J. KIENE.
BY R. E. Meech
ATTORNEY.

Patented Jan. 8, 1952

2,582,042

UNITED STATES PATENT OFFICE 2,582,042

VALVE

William Joseph Kiene, Park Ridge, Ill., assignor to Dorothy S. Kiene, Park Ridge, Ill.

Application July 31, 1946, Serial No. 687,394

8 Claims. (Cl. 251—23)

This invention relates to valves, and particularly to an improved valve especially adapted for connecting an indicator or gage to the cylinder of an engine, pump, compressor or the like for determining the pressure therein.

It is customary to connect a pressure indicator or other type of gage to the cylinder of an internal combustion engine, such as diesels and the like, in order to determine the compression in the various cylinders so that the operating efficiency of the engine can be computed. It is preferable to connect the indicator or gage to the cylinder by means of a valve so that the pressure of the gases issuing forth from the cylinder can be cut off after the pressure has been determined, and it is to a valve for such use that the present invention primarily relates.

While various valves for such a purpose have been heretofore suggested and used, they were not as practical as they could be due primarily to their size and inconvenience in operation. In testing a cylinder, it is the usual procedure to connect first such a valve to the cylinder either permanently or temporarily. The valve is then opened to the atmosphere so as to blow all dirt or accumulated carbon and tar and other foreign matter out of the cylinder and fluid passageways of the valve into the atmosphere before the indicator is attached in order to prevent fouling of the indicating instrument. The valve is then closed, the indicator attached to the valve, and the valve again opened so that the gas pressure will pass through the valve to the indicator and be recorded thereon. It will be seen that such procedure is not only inconvenient and laborious, but requires a considerable amount of time to test a given number of cylinders.

According to the present invention, there is provided a valve which is preferably attached to the cylinder permanently. It is relatively small and may be placed in such a location that would be prohibitive with the conventional type valve. The valve is so constructed and arranged that any foreign matter which may have accumulated in the valve passageways is blown therefrom into the atmosphere when the valve is partially open without carrying such foreign matter into the indicator. When the valve has been fully opened, the valve passageways are closed to the atmosphere thereby permitting the gases to pass through the valve to the indicator so as to indicate the correct pressure.

Accordingly, it is the general object of the present invention to provide an improved valve for connecting a pressure indicator to the cylinder of an internal combustion engine or the like, having passageways which are open freely to the atmosphere when the valve is in its closed or partially open position so that the passageways are blown free of foreign matter by the gas pressure issuing forth from the cylinder and, at the same time, releasing the gases from the indicator, and which are closed to the atmosphere when the valve is in its fully open position so as to permit the gases to pass through the passageways in the valve to the indicator to indicate the correct pressure.

It is another object of the invention to provide an improved valve which is simple and compact in its construction, and one which consists of a minimum number of parts which can be easily and inexpensively machined and assembled.

It is a further object of this invention to provide an improved valve which can be conveniently attached to and detached from the cylinder to be tested where space is limited and to which the indicator can be easily and quickly attached.

It is still another object of the present invention to provide an improved valve which will not stick or subject the parts of the valve to excessive strain due to relative contraction of the valve parts caused by the heat of the gases when the valve is in use thereby prolonging the life of the valve.

Various other objects and advantages of this invention will be more apparent in the course of the following specification and will be particularly pointed out in the appended claims.

In the accompanying drawings, there is shown for the purpose of illustration, one embodiment which my invention may assume in practice.

Figure 1:
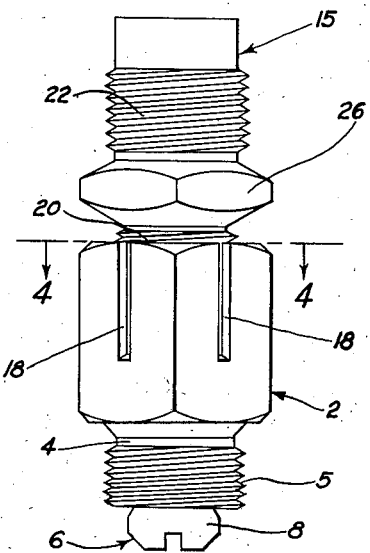
Fig. 1 is an elevational view of the improved valve of the present invention.
Figure 2:
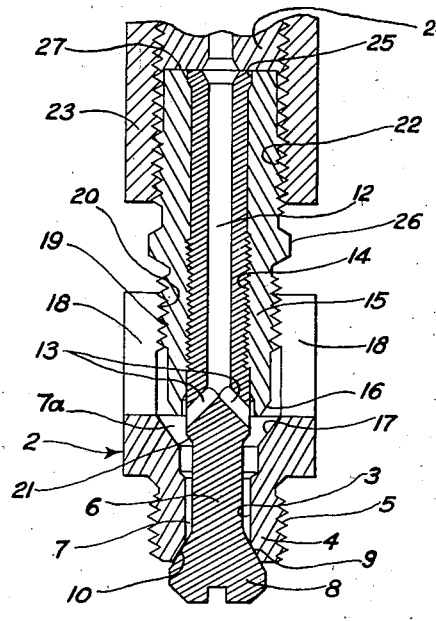
Fig. 2 is a vertical sectional view through my improved valve showing the valve in its closed position.

Referring more particularly to the drawings, the improved valve of my invention comprises a body member 2 having an opening 3 arranged axially thereof through which the fluid is adapted to pass. The inner reduced end portion 4 of the body member is cylindrical and is exteriorly threaded as at 5 for connecting the valve to the cylinder or source of fluid supply.

There is provided an elongated valve stem 6 with the inner end thereof being solid and extending through the opening 3 in the body member 2. This inner end portion has a diameter slightly smaller than that of the opening 3 so as to provide an annular passageway 7 therearound. On the inner end of the valve stem 6, there is arranged a valve head portion 8 having preferably an annular beveled or tapered valve portion 9 which cooperates with a corresponding annular beveled or tapered seat 10 arranged on the inner end of the body member 2 at the end of the opening 3 therein.

In the outer end portion of the valve stem 6 there is arranged axially thereof, an open-ended fluid passageway 12 which terminates intermediate the length thereof centrally of the body member and communicates with a pair of angularly arranged port holes 13 opening diametrically into the side wall of the valve stem adjacent the end of the annular passageway 7 of the body member 2.

The outer end portion of the valve stem 6 is exteriorly threaded as at 14 and there is screwed securely thereon, an elongated sleeve-like member 15 which extends from the outer end of the valve stem to a point adjacent the port holes 13 therein. There is arranged on the inner end of the sleeve-like member 15, an annular tapered valve portion 16 which cooperates with a corresponding tapered annular back seat 17 carried by the body member 2 adjacent the outer end of an enlarged chamber 7a at the outer end of the annular passageway 7 therein. The valve stem 6, the sleeve-like member 15 and the body member 2 are constructed and arranged so that the valve portion 16 cooperates with and seats on the back seat 17 when the valve portion 19 is spaced from its seat 10 to open the valve and so that the valve portion 16 is spaced from the back seat 17 when the valve portion 9 is seated on its seat 10 to close the valve, for a purpose hereinafter to be described.

Figure 4:
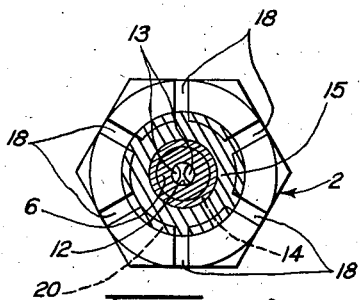
Fig. 4 is a sectional view taken on line 4—4 of Fig. 1.

The outer end portion of the body member 2 is preferably hexagonal-shaped in cross section, as clearly shown in Figs. 1 and 4 of the drawings, and in each of the hexes there is arranged an open-ended radial extending rectangular-shaped slot 18 which opens into both the inner and outer side walls of the hexes. Each of the slots 18 extend to a point adjacent the port holes 13 of the valve stem 6 and terminates directly next to the annular back seat 17 of the body member and communicates with the chamber 7a of annular passageway 7 therein. The outer end portion of the body member 2 is interiorly threaded as at 19 which threaded portion cooperates with an exteriorly threaded portion 20 arranged on the inner end portion of the sleeve-like member 15. It is the cooperation of these two threaded portions that moves the valve stem 6 reciprocally of the body member 2 when the sleeve-like member and valve stem which is attached thereto are rotated which actuates the valve to open and close the same in a manner to be described. There is carried by the valve stem 6, an annular beveled shoulder 21 which is positioned at a point immediately inwardly of the ports 13 so as to be disposed adjacent the end of the annular passageway 7. The largest diameter of this shoulder 21 is preferably substantially equal to or slightly larger than the diameter of the opening 3 in the body member for a reason hereinafter to appear.

The outer end portion of the sleeve-like member 15 is exteriorly threaded as at 22 for connecting the same to a sleeve 23 carried by the inner end 24 of an indicator (not shown). The valve stem 6 is locked into the sleeve-like member 15 preferably by peening the outer end thereof into a counterbore in the outer end of the sleeve-like member as at 25. There is carried by the sleeve-like member 15, centrally thereof, preferably a hexagonal-shaped or nut-like portion 26 to which a wrench may be applied for turning the sleeve-like member together with the valve stem 6 attached thereto to open and close the valve.

It is preferable that the pitch of the threaded portions 19 and 20 carried by the sleeve-like member 15 and body member 2, respectively, be relatively coarse and that the pitch of threaded portion 22 be relatively fine for a purpose hereinafter to be described.

Figure 3:
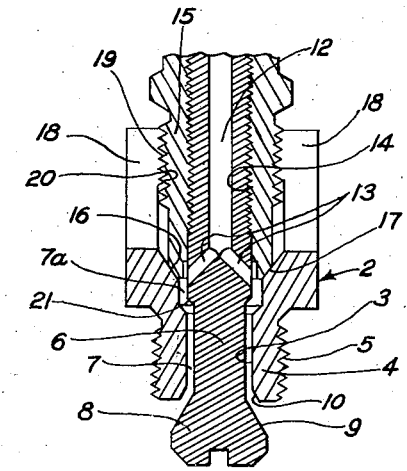
Fig. 3 is a fragmentary vertical sectional view of the inner portion of the valve, similar to Fig. 2, showing the valve in its fully open position.

The valve of my invention operates in the following manner. The valve is connected to the cylinder (not shown) to be tested or the source of fluid supply by means of the inner threaded portion 5. The indicator (not shown) is then connected to the valve by screwing it onto the outer threaded end portion 22 by means of the sleeve or coupling 23. Under normal operating conditions when the valve is closed, the indicator connection is first seated as at 27. Continued turning of the indicator rotates the sleeve-like member 15, together with the valve stem 6 attached thereto, and moves the head 8 away from its seat 10 to open the valve to the cylinder due to the action of the threads 19, 20. When the valve is partially open it will be seen that the gases pass from the cylinder into and through the annular passageway 7 and into the chamber 7a. Due to the fact that the valve is only partially open during the initial turning period, the gases will carry any foreign matter in the cylinder and the passageway to the atmosphere out through the slots 18 in the side wall of the body member 2 between the valve portion 16 and its back seat 17. It is the purpose of the annular shoulder 21 to deflect the gases into the slots 18 and away from the ports 13. Further turning of the indicator and valve stem seats the valve portion 16 on its back seat 17, as shown in Fig. 3, thereby closing the chamber 7a and annular passageway 7 to the slots 18 and to the atmosphere, so that the gases are then permitted to pass from the annular chamber 7 into and through the ports 13 into the valve stem passageway 12 and to the indicator thereby setting the same in operation.

After the pressure has been recorded on the indicator, the valve is closed by turning the indicator and valve stem 6 in the opposite direction. It will be understood that the torque used in making up the indicator connection is the same as that used in freeing thread 20 when opening the valve and making the back seat at 17. It is well known that the amount of torque required to free a thread varies directly as its pitch diameter and inversely as its pitch. Consequently, when the valve stem 6 is turned in the opposite direction, it will be seen that threads 20 having a lesser diameter and greater pitch than thread 22 is the first to be freed, and the valve portion 16 is lifted from its back seat 17 and on continued turning the valve portion 9 is finally seated on its seat 10, as shown in Fig. 1, to close the valve to the cylinder. It will be seen that the closing of the valve opens the valve passageway 12 to the slots 18 and to the atmosphere thereby permitting the gases trapped in the indicator to be released to the atmosphere in readiness for the next testing operation. Further turning of the indicator breaks the threaded connection at 22 and frees the indicator from the valve.

It will be understood that the slots 18 in the body member 2 not only provide a means for venting the passageways 7 and 12 to the atmosphere when the valve is closed or partially open, but also provide for a relatively flexible connection between the valve stem 6 and body member. This is a decided advantage for the reason that when the valve is open, the valve stem is heated by the gases to a considerably higher temperature than that of the body member, and the flexible support provided by these slots at the connection of the body member with the valve stem prevents excessive strain on the valve stem, due to its greater contraction when the valve is closed.

As a result of my invention, it will be seen that there is provided a new and novel valve which not only is simple and inexpensive in its construction, but one which is efficient and effective in its use so as to reduce the time and effort materially for pressure testing any given number of cylinders or the like. It will be seen further that the use of my valve enables the operator to indicate a cylinder by attaching the indicator to the valve and opening the same in one turning operation and then closing the valve and removing the indicator by one turning operation in the reverse direction, thereby eliminating the step of blowing the valve free of dirt as a separate operation before the indicator is attached to the valve, which is a decided advantage.

While I have shown and described an embodiment which my invention may assume in practice, it will be understood that this embodiment is merely for the purpose of illustration and description, and that other forms may be devised within the scope of my invention as defined in the appended claims.

What I claim as my invention is:

1. A valve of the class described comprising a body member having an opening arranged therethrough axially thereof through which fluid is adapted to pass, a valve stem extending through the opening in said body member having a smaller diameter than that of said opening so as to provide an annular passageway therearound, a valve head arranged on the inner end of said valve stem, said body member having a seat arranged on the inner end thereof with which said valve head cooperates to close the valve, said valve stem having a passageway arranged therein axially thereof opening into the side wall thereof intermediate the length thereof and communicating with the annular passageway around said valve stem, a sleeve-like member secured to said valve stem, an annular seat arranged on the inner end of said sleeve-like member and disposed at a point adjacent the opening of said passageway in the side wall of said valve stem, a back seat carried by said body member with which said annular seat cooperates when the valve is fully open, common means for venting both the passageways in said valve stem and the annular passageway to the atmosphere when said valve is closed or partially open, means for moving said valve stem reciprocably relative to said body member so as to open the valve with the fluid adapted to pass from the inner end of said body member through the annular passageway and into and through the passageway in said sleeve-like member, and so that said annular seat carried by said valve stem seats on the back seat carried by said body member when said valve is fully open so as to close both of said passageways to the atmosphere.

2. A valve of the class described, as defined in claim 1, including means carried by the valve stem for deflecting the fluid passing through the annular passageway away from the valve stem passageway to the venting means and the atmosphere when the valve is partially open.

3. A valve of the class described, as defined in claim 1, wherein the means for moving the valve stem reciprocably relative to the body to open and close the valve consists of an interiorly threaded portion carried by the body member and an exteriorly threaded portion carried by the sleeve-like member which cooperate to move the valve stem relative to the body member when the latter is rotated.

4. A valve of the class described, as defined in claim 1, wherein the common means for venting the passageway in the valve stem and the annular passageway therearound to the atmosphere consists of a plurality of longitudinally extending slots extending through the wall of the body member and terminating immediately above the back seat of said member.

5. A valve of the class described comprising a body member having an opening arranged axially therethrough through which fluid is adapted to pass, a valve stem extending through the opening in said body member having a smaller diameter than the opening in said body member so as to provide an annular passageway therearound, a valve head arranged on the inner end of said valve stem, said body member having a seat arranged on the inner end thereof with which said valve head cooperates to close the valve, said valve stem having a fluid passageway arranged therein axially thereof opening into the side wall thereof intermediate the length thereof, and communicating with the annular passageway around said valve stem, a sleeve-like member secured to said valve stem and with the inner end of said sleeve-like member extending to a point adjacent the opening of the passageway in the side wall of the valve stem, an annular seat arranged on said end of said sleeve-like member, a back seat carried by said body member with which said annular seat cooperates when the valve is open, the outer end of said body member being interiorly threaded and disposed around the inner end of said sleeve-like member, the inner end of said sleeve-like body member being exteriorly threaded which threads cooperate with the interiorly threaded portion of said body member to open and close the valve, the outer end portion of said body member having a plurality of longitudinally extending open end slots arranged through the wall thereof which communicate with the annular passageway around said valve stem and the passageway in said valve stem, the inner end portion of said body member being exteriorly threaded for connecting the valve to the source of fluid supply, said slots adapted to vent both the passageway in said valve stem and said annular passageway to the atmosphere when said valve is closed or partially open, said annular seat carried by said sleeve-like member adapted to cooperate with the back seat carried by said body member when the valve is fully open so as to close all of said passageways to the slots and to the atmosphere, with the fluid passing through said annular passageway into and through the passageway in said valve stem.

6. A valve of the class described, as defined in claim 5, including an annular shoulder arranged on the valve stem directly below the passageway opening into the side wall thereof for deflecting the fluid away from the valve stem passageway into the slots in the body member and to the atmosphere when the valve is partially open.

7. A valve of the class described, as defined in claim 5, including an exteriorly threaded portion arranged on the outer end of the sleeve-like member for connecting the same to means to which the fluid is adapted to be delivered.

8. A valve of the class described, comprising a body member having an opening arranged therethrough axially thereof through which fluid is adapted to pass, means arranged on the inner end of said body member for connecting the valve to the device with which it is adapted to be used, a valve stem extending through said opening having a portion thereof of a smaller diameter than that of said opening so as to provide an annular passageway therearound, a valve head arranged on the inner end of said valve stem, said body member having a seat arranged on the inner end thereof with which said valve head cooperates to close the valve, said valve stem having a fluid passageway arranged axially thereof opening into the side wall thereof intermediate the length thereof and communicating with said annular passageway, a sleeve-like member secured to said valve stem with the inner end of said sleeve-like member extending to a point adjacent the opening of the passageway in the side wall of said valve stem, an annular seat arranged on said end of said sleeve-like member, a back seat carried by said body member with which said annular seat cooperates when the valve is open, the outer end of said body member being interiorly threaded and disposed around the inner end of said sleeve-like member which is exteriorly threaded and cooperates therewith to open and close the valve, an opening arranged in the side wall of said body member communicating with said annular passageway for venting the same to the atmosphere, an exteriorly threaded portion arranged on the outer end of said sleeve-like member to which an indicator is adapted to be attached with the threads of the threaded portion being finer than those on the inner end of said sleeve-like member, said annular seat carried by said sleeve-like member adapted to cooperate with the back seat carried by said body member when the valve is fully open so as to close the annular passageway to the atmosphere.

WILLIAM JOSEPH KIENE.

REFERENCES CITED

The following references are of record in the file of this patent:

UNITED STATES PATENTS

| Number | Name | Date |
| --- | --- | --- |
| 1,279,087 | Desmond | Sept. 17, 1918 |
| 1,376,534 | Grikscheit | May 3, 1921 |
| 1,579,096 | Elliott | Mar. 30, 1926 |
| 1,825,290 | Stevens | Sept. 29, 1931 |